United States Patent
Allsop et al.

(10) Patent No.: US 8,827,300 B2
(45) Date of Patent: Sep. 9, 2014

(54) COUPLING DEVICE

(76) Inventors: John R. Allsop, Mont Albert (AU); Neville J. Withers, Lower Templestowe (AU)

(*) Notice: Subject to any disclaimer, the term of this patent is extended or adjusted under 35 U.S.C. 154(b) by 294 days.

(21) Appl. No.: 13/203,747

(22) PCT Filed: Mar. 1, 2010

(86) PCT No.: PCT/AU2010/000235
§ 371 (c)(1),
(2), (4) Date: Aug. 29, 2011

(87) PCT Pub. No.: WO2010/102322
PCT Pub. Date: Sep. 16, 2010

(65) Prior Publication Data
US 2011/0309600 A1 Dec. 22, 2011

(30) Foreign Application Priority Data
Mar. 10, 2009 (AU) .............................. 2009901025

(51) Int. Cl.
*B60D 1/06* (2006.01)
*B60D 1/28* (2006.01)
*B60D 1/52* (2006.01)

(52) U.S. Cl.
CPC *B60D 1/065* (2013.01); *B60D 1/28* (2013.01); *B60D 1/52* (2013.01)
USPC .......................................... 280/511; 280/492

(58) Field of Classification Search
USPC ................. 280/492, 504, 507, 511, 474, 488
See application file for complete search history.

(56) References Cited

U.S. PATENT DOCUMENTS

| 1,736,036 | A | * | 11/1929 | De Vega | 280/471 |
|---|---|---|---|---|---|
| 2,221,278 | A | * | 11/1940 | Utterback | 280/492 |
| 2,457,885 | A | * | 1/1949 | Gatch | 280/486 |
| 2,696,392 | A | * | 12/1954 | Case | 280/513 |
| 2,755,105 | A | * | 7/1956 | Wells | 280/513 |
| 2,871,030 | A | * | 1/1959 | Hollis | 280/492 |
| 2,890,065 | A | * | 6/1959 | Shaffer | 280/492 |
| 3,103,798 | A | * | 9/1963 | Piatti | 464/128 |
| 3,900,212 | A | * | 8/1975 | Ewing | 280/406.2 |
| 4,004,822 | A | * | 1/1977 | Fisk | 280/416.1 |
| 4,072,320 | A | * | 2/1978 | Powell | 280/416.1 |
| 4,193,611 | A | * | 3/1980 | Fisk | 280/416.1 |
| 4,200,306 | A | * | 4/1980 | Helms | 280/494 |
| 4,729,571 | A | * | 3/1988 | Tienstra | 280/416.1 |
| 4,772,039 | A | * | 9/1988 | Cook | 280/416.1 |
| 5,169,168 | A | * | 12/1992 | Harry et al. | 280/511 |
| 5,219,436 | A | * | 6/1993 | Abbott | 280/512 |
| 5,860,669 | A | * | 1/1999 | Wass et al. | 280/416.1 |

(Continued)

*Primary Examiner* — Anne Marie Boehler
*Assistant Examiner* — Maurice Williams
(74) *Attorney, Agent, or Firm* — Jennifer L. Bales; Macheledt Bales LLP

(57) ABSTRACT

A coupling device for coupling a first vehicle to a second towed vehicle, the coupling device including a pillar (3) for mounting to a towbar attached to the first vehicle; a connector (30) for connection to the second towed vehicle; a sleeve (13) linked to the connector (30) and adapted for engagement with the pillar (3) by fitting over the pillar (3); and a collar (15) adapted to fit over and engage with a portion of the sleeve (13) for movement with respect to the sleeve (13); wherein the collar (15) is movable with respect to the sleeve (13) between a first unlocked position in which the sleeve (13) is removable from the pillar (3) and a second locked position in which the sleeve (13) is not removable from the pillar (3).

27 Claims, 7 Drawing Sheets

(56) References Cited

U.S. PATENT DOCUMENTS

| | | | |
|---|---|---|---|
| 5,984,342 A * | 11/1999 | Ysker | 280/492 |
| 6,234,495 B1 * | 5/2001 | Velke | 280/32.7 |
| 6,264,229 B1 * | 7/2001 | Gill et al. | 280/441.2 |
| 6,343,808 B1 * | 2/2002 | Luh | 280/511 |
| 6,540,426 B2 * | 4/2003 | Cloyd et al. | 403/122 |
| 6,808,195 B2 * | 10/2004 | Smith | 280/417.1 |
| 7,125,036 B2 * | 10/2006 | Moss et al. | 280/511 |
| 8,118,323 B2 * | 2/2012 | Hudson | 280/494 |
| 2002/0113405 A1 * | 8/2002 | Moss et al. | 280/416.1 |
| 2005/0082788 A1 * | 4/2005 | Lippons | 280/511 |
| 2006/0097483 A1 * | 5/2006 | White | 280/511 |
| 2007/0102898 A1 * | 5/2007 | Schulze | 280/507 |
| 2007/0170693 A1 * | 7/2007 | Marcy | 280/483 |
| 2008/0073874 A1 * | 3/2008 | Riehle et al. | 280/511 |
| 2008/0106065 A1 * | 5/2008 | Cutts | 280/504 |
| 2009/0267323 A1 * | 10/2009 | Belinky et al. | 280/511 |

\* cited by examiner (Unlocked)

(Unlocked)

(Locked)

COUPLING DEVICE

FIELD OF THE INVENTION

This invention relates to a coupling device and more particularly relates to couplings or hitches for linking a first vehicle to a second vehicle, such as a trailer, for the purposes of towing the second vehicle over uneven ground where a wide range of articulation between the first vehicle and the second vehicle is required.

BACKGROUND OF THE INVENTION

Existing couplings such as ball-couplings have the advantage of ease of attachment because the cup self-centres as it settles onto the spherical top of the tow-ball. However the range of articulation is restricted by the neck of the tow-ball contacting the edges of the cup.

Ball-couplings are retained on a tow-ball by a single tongue engaging the underside of the head of the tow-ball. To ensure automatic primary-locking the tongue is held in the engaged position by a powerful spring. In many jurisdictions a means of automatic secondary-locking of the tongue, in the position that precludes coupling separation, is mandated. Considerable force is required to retract the tongue, against the influence of the primary-locking spring, to a position where the ball-coupling's cup can disengage the tow-ball.

A variety of mechanisms have been adopted to fulfill the objective of providing a hitch, between a vehicle and a trailer, that will provide a greater range of articulation than is possible with a conventional tow-ball coupling. These mechanisms include:

(1) The pintle hook;
(2) An improved ring-type (pintle hook) coupling called the VC Coupling (Manufactured by Vehicle Components Australia);
(3) A ball-coupling with a tongue locking mechanism where secondary axes of rotation are provided between the cup, that engages a conventional tow-ball, and the trailer. The parts involved in the secondary axes of rotation dictate a design of the tongue locking mechanism that makes disengagement of the tongue particularly difficult;
(4) Couplings that have in common the manual insertion of a hitching-pin which links the vehicle and trailer components of the hitch together and thereby also provides one of three axes of rotation for movement of the trailer relative to the vehicle; and
(5) A coupling that self centres over a conical pillar and is retained on the pillar by a plate engaging in a circumferential groove in the pillar.

The pintle hook coupling is easy to connect but noisy and subject to wear because of the large amount of play between the ring and the hook. It is still used on heavy vehicles but has not found favour with domestic users wanting to use a car or four-wheel-drive to tow a trailer into rugged terrain.

The improved VC coupling pintle hook reduces noise but linking the vehicle and the trailer requires a special spanner to do up a clamp-bolt and the manual application of a clamp-ring-assembly to stop the clamp-bolt working loose. The range of articulation is less than that provided by other alternatives and the lack of automatic primary-locking and secondary-locking, against coupling disengagement, is a significant disadvantage.

The addition of supplementary axes of rotation to a ball-coupling with a tongue locking mechanism has been associated with the cup binding on the tow-ball and either damaging it or undoing it from the tow-bar. The mechanism has also been associated with difficulties disengaging the tongue that locks the cup onto a conventional tow-ball because the handle used to withdraw the tongue from the locked position is not aligned with the shaft that withdraws the tongue.

Couplings that employ hitching-pins suffer from the disadvantage of difficulty with inserting the hitching-pin when the respective vehicle and trailer components are not accurately aligned. Alignment of the components requires an exact height match between the vehicle part and the trailer part. Every time a vehicle moves its tow-bar subtly it changes height as power and/or brakes are applied. For this reason it is impractical to back the vehicle to a position where the trailer and vehicle components are engaged and ready to receive the hitching pin that definitively links them together. Instead the trailer has to be manually manoeuvered, with jockey wheel changes as required, until the vehicle and trailer components are fully aligned.

For this reason hitching-pin couplings are not particularly suitable for heavier trailers or caravans that cannot be man-handled into an exact position for successful insertion of the hitching-pin. Problems manoeuvering a trailer to obtain accurate component-alignment for hitching-pin insertion are multiplied if the wheels of the trailer are on uneven ground or in sand. Dual axle trailers are also hard to manually align because movement, other than directly fore and aft, requires sufficient force to scrub the tyres.

Hitching-pin removal can also be very difficult or impossible when the coupling is under load. The substantial lifting force of a jockey wheel, which can be used to separate a ball-coupling, is of no assistance in removing a wedged in hitching-pin.

Couplings that employ hitching-pins do not incorporate automatic primary-locking against coupling disengagement. This is because any mechanism that automatically delivered and locked the long hitching-pin into position would be too cumbersome for practical use. It would also be difficult to manually disengage any automatic hitching pin insertion mechanism that was forceful enough to insert the hitching-pin when the vehicle and the trailer components were not precisely aligned.

Some couplings, that employ hitching-pins, do offer an automated mechanism for secondary locking of the hitching-pin into a position that avoids coupling disengagement but this does not offer a requisite level of safety.

Couplings that self centre over a conical pillar do not have an automatic primary locking mechanism. In addition the primary locking mechanism of the plate engaging the circumferential groove is exposed to contamination with dirt that may impair functionality. The bearing surface of the conical pillar is likewise exposed to contamination with dirt that may seize the trailer component of the coupling onto the pillar.

Furthermore, couplings with a long vertical dimension impede full opening of any door on the rear of a vehicle.

The recently released "Drop on 35" coupling manufactured by Vehicle Components Australia does not provide automatic primary locking. This carries the risk of forgetting to lock the coupling before moving off. There is also a risk that an inquisitive person can "play" with the coupling while the owner is absent and inadvertently leave it in the unlocked configuration. Few owners would routinely check a coupling after a break in their travels.

SUMMARY OF THE INVENTION

According to an aspect of the invention, there is provided a coupling device for coupling a first vehicle to a second towed vehicle, the coupling device including a pillar for mounting to a towbar attached to the first vehicle: a connector for connection to the second towed vehicle; a sleeve linked to the connector and adapted for engagement with the pillar by fitting over the pillar; and a collar adapted to fit over and engage with a portion of the sleeve for movement with respect to the sleeve; wherein the collar is movable with respect to the sleeve between a first unlocked position in which the sleeve is removable from the pillar and a second locked position in which the sleeve is not removable from the pillar.

Preferably the collar is rotatable with respect to the sleeve or the collar is movable along the sleeve. The sleeve may have at least one aperture extending through the wall of the sleeve and a locking element positioned in each aperture of said at least one aperture. In the second locked position each locking element may have a portion that protrudes inwardly beyond an internal face of the sleeve wall and in the first unlocked position each locking element may reside at least partially within a respective aperture such that no portion of each locking element protrudes inwardly beyond the internal face of the wall of the sleeve, to enable the sleeve to slide freely over the pillar.

In an embodiment of the invention the collar has at least one recess and the collar is adapted to be rotated to a position where a recess of said at least one recess is aligned with an aperture of said at least one aperture in the sleeve to enable movement of each respective locking element to either the first unlocked position or the second locked position.

Preferably, in the first unlocked position a portion of each locking element resides within a respective recess of the collar and to move each locking element from the first unlocked position to the second locked position the recess has a cam surface whereupon rotation of the collar the cam surface contacts the locking element to push the locking element further into the aperture to assume the second locked position.

According to an embodiment of the invention the pillar has a head, neck and body and a groove between the head and neck and wherein further each locking element contacts the groove whenever the sleeve is attempted to disengage from a position of full engagement on the pillar while the collar is in the second locked position.

In order move each locking element from the second locked position to the first unlocked position, the collar is preferably rotated such that a respective recess is aligned with the aperture, thereafter the sleeve is displaced with respect to the pillar so that each locking element bears against the groove and an underside of the head of the pillar and continued displacement of the sleeve forces each element to move in the aperture and partially into the aligned recess so that no portion of each locking element protrudes inwardly beyond the internal face of wall of the sleeve.

In the process of fully engaging the sleeve with the pillar, the collar can be rotated to the first unlocked position such that a respective recess is aligned with the aperture, thereafter the sleeve is preferably moved with respect to the pillar such that the head displaces each locking element to a position in a respective aperture and partially into the aligned recess so that no portion of each locking element protrudes inwardly beyond the internal face of the wall of the sleeve.

Preferably the sleeve is rotatable with respect to the pillar about a first axis and the collar is rotatable with respect to the sleeve about the first axis.

The connector may include a yoke having a pair of arms and a shaft connected to the yoke, the shaft rotatable within a tube that is connected to the second towed vehicle through a plate. Preferably each arm of the yoke is connected to the sleeve by respective securing means. The securing means may be formed by a projection extending each from opposed sides of the sleeve to engage with a respective yoke arm. Alternatively, the securing means protrude through respective bores oppositely located in the wall of the sleeve. Each bore may be threaded and the arms compressed toward one another by threading the respective securing means into a respective bore, such that friction is present between each securing means and respective bore, the yoke adapted for rotation about a second axis aligned with the centre of each bore through the movement of each securing means along a thread in the respective bore.

In an embodiment of the invention, the shaft may rotate about a third axis within the tube, so that movement between the first vehicle and the second towed vehicle through the coupling device is with respect to the first, second and third axes.

The sleeve may have a slot for receiving a projection that resides in the wall of the collar to prevent separation of the collar from the sleeve, the projection moveable within the slot in accordance with the relative movement of the collar and sleeve between the first unlocked position and the second locked position.

One or more indicia means may be located on the collar or sleeve to indicate when no portion of the recess is aligned with a respective aperture.

A portion of the body of the pillar adjacent the neck can be formed as a part-hemispherical section and the head, neck, part-hemispherical section and body can be defined such that when the bottom of the sleeve is level with the top of the body, the axis of the sleeve is fully aligned with the axis of the body to form the first axis, wherein continued engagement of the sleeve over the pillar is not impeded by any part of the pillar.

The sleeve may have first and second external shelves of different diameters with respect to the first axis, in which the first external shelf supports the collar and the second external shelf supports the biasing means.

BRIEF DESCRIPTION OF THE DRAWINGS

A preferred embodiment of the invention will hereinafter be described, by way of example only, with reference to the drawings in which.

DETAILED DESCRIPTION OF THE PREFERRED EMBODIMENT

Figure 1:
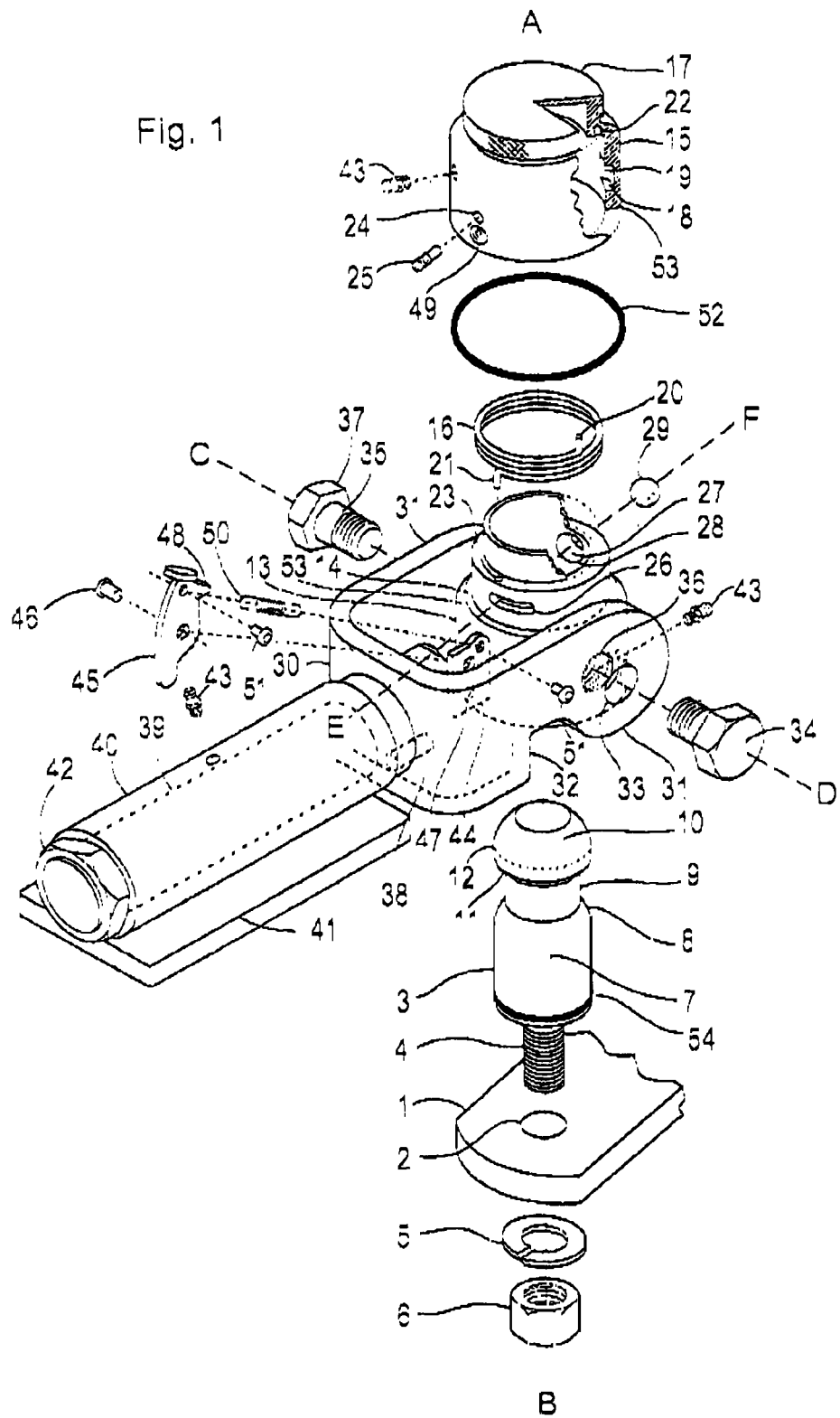
FIG. 1 is an exploded perspective view of a coupling device according to an embodiment of the invention.

The following described features are of a coupling device according to a preferred embodiment.

A towed second vehicle, such as a trailer, can be oriented in any position relative to a towing first vehicle if the coupling between each provides three separate axes of rotation that are mutually at right angles to each other.

The coupling according to an embodiment of the invention provides three such axes of rotation and the first axis is the mating of a trailer-attached cylindrical sleeve to a pillar that is integral with or rigidly attached to the tow-bar on the towing vehicle. An automated locking mechanism maintains the sleeve on the pillar while towing.

The second axis of rotation occurs where a connector, in the form of a yoke, is pivoted off the lower part of the sleeve, such that the line representing the yoke's axis of rotation passes through and at a right angle to the central axis of the sleeve. The third axis of rotation is provided by a shaft, which is attached to the back of the yoke, rotating inside a tube that is securely attached to the trailer. The line of the third axis of rotation passes through the centre line of the sleeve and lies at right angles to the line representing the axis of rotation of the yoke on the sleeve.

Sliding a cylindrical sleeve over a closely mated cylindrical pillar is impossible until the axis of the sleeve is accurately aligned with the axis of the pillar. To be practical, a coupling based on having a closely fitted sleeve rotate around a pillar needs a specific pillar design that avoids the sleeve jamming on the pillar part way into the required full engagement. The pillar design also has to minimise the chances of a sleeve, that presents in an off-centre manner to a pillar, pivoting on the pillar, at the point of first contact, and thereby sliding off the pillar instead of progressively engaging with it as the sleeve is lowered by a force acting at the yoke's line of pivoting on the sleeve.

To avoid jamming and/or sliding off part way through mating the upper part of the pillar has a defined shape that accepts and directs a sleeve, whose axis is not initially fully aligned with the pillar's axis, into an orientation where the sleeve is correctly aligned to allow a continued smooth engagement of the sleeve over the lower part of the cylindrical body of the pillar.

A pillar shape that meets these requirements is symmetric about a vertical (first) axis and is best described as having four continuous segments which are termed, from above down, the head, the neck, the curved or hemispherical-section and the body. The head is preferably part-spherical, having a defining radius of length "R" and an equatorial plane that lies at right angles to the axis of the pillar. The neck extends from the underside of the head, at a level below this equatorial plane, down to the top of the dome of the hemispherical-section. The hemispherical-section also has a defining radius "R" and its base merges seamlessly with the body which is a right regular cylinder that has the same defining radius of length "R".

The profile of the part-spherical head above the neck, from below up as seen in a vertical section through the long axis of the pillar, comprises a groove and a buffer-zone that lie below the equatorial plane.

The groove is where locking elements, in the form of ball-bearings, located in apertures in the wall of the sleeve, will engage to retain the sleeve on the pillar whenever the ball-bearings are stopped, by a collar, from displacing to a position where they can lie outside the circumference of the equator of the head. The profile of the groove, as seen in a vertical section through the long axis of the pillar, is matched to the profile of the upper part of the ball bearing that will engage it when the sleeve is locked onto the pillar and an attempt is being made to lift the sleeve off the pillar.

The profile of the buffer zone, as seen in a vertical section through the long axis of the pillar, is an indented line that falls inside the theoretical continuation of the part-spherical head below a point below the equatorial plane. The purpose of the buffer zone is to ensure that any distortion of the groove's junction with the buffer zone, by pressure from the retaining ball-bearings, will not cause a protrusion that falls outside the line represented by the theoretical continuation of the part-spherical head below the equatorial plane. Such a protrusion, beyond the theoretical continuation of the part-spherical head below the equatorial plane would impair the sleeve engaging the pillar below that level.

The profile of the neck, as seen in a vertical section through the long axis of the pillar, is such that it cannot impede the ball-bearings moving freely in response to the position of the collar.

The profile of the neck, as seen in a vertical section through the long axis of the pillar, is also configured to ensure that a sleeve passing over the head will not encounter a contour, in the neck's profile that would impede continued smooth descent of the sleeve over the pillar. It is self evident that a variety of profiles can satisfy this requirement.

The profile of the neck, as seen in a vertical section through the long axis of the pillar, is also configured to ensure that a sleeve passing over the head cannot contact the curved or hemispherical-section at an angle that would impede continued smooth descent of the sleeve over the hemispherical-section. It is self evident that a variety of profiles can satisfy this requirement.

The tendency for a misaligned sleeve to flip off the pillar during attempted engagement is minimised by having the sleeve's axis of rotation within the yoke (second axis) as close as practical, in terms of strength, to the bottom of the sleeve. This arrangement maximises the probability of downward forces, applied at the axis of rotation of the sleeve in the yoke, creating a moment that acts to further align the sleeve with the pillar rather than acting to increase any existing angulation between the axis of the sleeve and the axis of the pillar.

Initial misalignment between the sleeve and the pillar can be linear as well as angular. Extreme linear misalignment will result in the sleeve completely missing the pillar. When a linear misaligned sleeve contacts any part of the head above the level of the equator of the head the downward force applied at the yoke's pivot line will create a moment that wants to tilt the sleeve on the head. Whether this moment tilts the sleeve toward or away from the central axis of the pillar depends on the location of the vector, representing the yoke's net downward thrust, relative to the point of the sleeve's contact with the head.

Even if this moment initially tilts the sleeve away from alignment with the central axis of the pillar the sleeve will still align onto the pillar provided that at the stage that the sleeve strikes the neck or hemispherical-section the vector, representing the net downward force applied by the yoke, passes between the pillar's central axis and the point where the sleeve is striking the neck or the hemispherical section.

Truncation of the top of the head to create a flat area encourages users to achieve an initial degree of linear alignment where the bottom of a presented sleeve does not sit on the flat of the head. When this desired initial linear alignment is combined with making the yoke's pivot point on the sleeve as low as is practical then a configuration is achieved whereby the vector, representing the net downward force applied by the yoke, will always pass between the pillar's central axis and the point where the sleeve strikes the neck or the hemispherical-section.

A jockey wheel on a trailer draw bar will provide the ability to progressively lower the cylindrical sleeve onto the pillar in a controlled manner. Any tendency toward flipping off is readily recognisable and can be overcome by subtly moving the trailer and or towing vehicle to reposition the sleeve more directly over the pillar while the parts still remain incompletely engaged.

If flipping off is avoided then progressive descent of the sleeve over the pillar culminates in the sleeve being in circumferential contact with the equator of the head and the junction of the hemispherical-section with the cylindrical body at which stage the central axis of the sleeve is in perfect alignment with the central axis of the pillar and the sleeve is perfectly positioned to slide smoothly onto the body of the pillar until it rests upon the tow-bar.

A properly constructed and loaded trailer has the majority of the mass forward of the trailer wheels. This is known as "Trailer ball weight" and is defined as the downward thrust produced at the vehicle end of the draw bar by gravity acting on this unequally distributed mass.

The disclosed coupling has trailer ball weight transmitted to the sleeve at the axis of rotation of the sleeve within the yoke. Trailer ball weight therefore acts to engage the sleeve on the pillar provided that at presentation the central long axis of the pillar falls reasonably well inside the inside-diameter of the sleeve and the trailer is free to move a small amount in response to the changing position of the sleeve as engagement with the pillar proceeds.

The more accurately the sleeve is initially positioned over the pillar the less the trailer needs to move as engagement progresses. The force required to move the trailer, as engagement between the sleeve and the pillar proceeds, may be provided solely by the component of the trailer ball weight down thrust that is acting in the desired direction as a consequence of the sleeve pressing upon the neck and hemispherical-section of the pillar.

Subtle manual adjustment of the trailer's position or movement of the towing vehicle will be necessary if the trailer ball weight is too small in comparison to any resistance to trailer movement. The same situation prevails when a conventional ball-coupling is mated with a conventional tow-ball. In both instances the inherent tendency of the coupling to self-centre is advantageous when compared with the more precise degree of initial alignment required to insert a hitching-pin.

In this embodiment, the coupling device only requires the sleeve to be maintained, by a jockey wheel or stand, well above the height of the pillar while the vehicle is used to correctly position the pillar below the sleeve. There are no issues with subtle changes in tow-bar height causing the pillar to push the sleeve out of alignment.

In this embodiment, the coupling device does not require trailer ball weight to be transmitted to the head of the pillar. Trailer ball weight is preferably supported directly by the sleeve coming to rest on the tow-bar when it fully engages the pillar. A bearing washer can be inserted between the base of the pillar and the top of the towbar. The outer diameter of the washer is large enough to form a bearing surface for the sleeve to rest upon during its rotation about the pillar. The washer can be made of a different material, such as brass, to the sleeve material which is usually steel. This disparity in materials will reduce wear on the bottom of the sleeve and the top of the towbar.

The coupling device does not transmit any towing forces to the head of the pillar. The head, neck and part-hemispherical-section of the pillar only exist to facilitate engagement of the sleeve with the body of the pillar. All towing forces are transmitted through the body of the pillar. The internal diameter of the region of the sleeve positioned opposite and above the equator of the head of the pillar exceeds the diameter of the portion of the head opposite the sleeve region, when the sleeve is fully engaged with the pillar.

The disclosed coupling device has an automated means of anchoring the sleeve to the pillar as well as the above described practical means of engaging the sleeve on the pillar and allowing the trailer-ball-weight to be transmitted directly to the tow-bar.

The adopted locking mechanism involves a ball-bearing creating interference to longitudinal displacement of the sleeve on the pillar by simultaneously engaging with the groove in the pillar and a hole that extends through the full thickness of the wall of the sleeve.

Locking and unlocking the locking mechanism involves controlling whether the ball-bearing can be pushed back into the hole in the wall of the sleeve so that it no longer engages the groove, buffer zone or head and thereby allows the sleeve to be displaced longitudinally on the pillar.

The element controlling whether the ball-bearing is obliged to engage the groove consist of a collar on the outside of the sleeve. The collar has a recess therein that is deep enough to allow the ball-bearing to disengage the head when the recess overlies the hole in the wall of the sleeve.

When the ball-bearing's diameter exceeds the length of the hole in the wall of the sleeve the movement of the collar, to a position where the recess does not overlie the hole, causes a cam surface of the recess to push the ball-bearing inwards to a position where it will engage the groove if an attempt is made to lift the sleeve upwards from a resting position on the towbar.

The diameter of the inner end of the hole in the wall of the sleeve is restricted so that the ball-bearing cannot exit that end when the sleeve is not engaged with the pillar. The restriction in the diameter of the hole in the wall of the sleeve at its inner end is not so tight that the ball-bearing cannot move sufficiently to securely engage the groove in the pillar.

A spring automatically locks the sleeve to the pillar (primary-locking) by moving the collar to the position where the recess does not overlie the hole in the wall of the sleeve.

A spring operated secondary-lock is also incorporated so that manual movement of the collar, to a position where the recess overlies the hole in the wall of the sleeve, is only possible after manual release of this secondary-lock.

The primary and secondary locking mechanisms are readily accessible and operable with any position of the yoke.

An antitheft mechanism, such as a padlock, may be incorporated to deny separation of the sleeve from the pillar by directly restricting movement of the collar or indirectly by restricting release of the secondary lock. The antitheft mechanism is simultaneously operative to avoid access to the element that secures the collar to the sleeve.

The antitheft mechanism can be in place during towing over uneven terrain.

Separation of the collar from the sleeve, when the antitheft mechanism is not engaged, is required for servicing of the moving internal components of the coupling (such as the spring acting as a primary lock and the ball-bearings).

Friction is introduced into the pivoting of the sleeve within the yoke (about the second axis of rotation) in order to stop an uncoupled top-heavy sleeve from toggling over, under the influence of gravity, to an orientation that would make coupling difficult.

The preferred embodiment to control unwanted tilting of the sleeve when it is not connected to the pillar is provided by putting the pivot-bolts that the sleeve rotates upon under constant tension. The pivot bolts pass through aligned and non-threaded holes in each side of the yoke to screw into aligned threaded holes on opposite sides of the sleeve. The pivot-bolts are tensioned until the arms of the "U" shaped yoke are compressed toward, but do not come into contact with, the sides of the sleeve. The heads of the pivot bolts are then welded to the outside of the yoke. The yoke acts as a spring to retain the desired tension on the pivot-bolt's engagement with the sleeve and thereby provides the desired friction to avoid free rotation of the sleeve on the pivot-bolts.

There is a permanent gap between the side of the sleeve and the inside of the yoke that allows the sleeve to move along the pivot-bolts as it tilts up and down to accommodate varying orientations of the towing vehicle relative to the towed trailer during travel over undulating ground.

A protrusion on the yoke or the sleeve blocks the sleeve from rotating end over end to the point where the sleeve abutted the inside face of the yoke. Connecting a coupling that could assume such a configuration would result in unacceptable stresses on the pivot-bolt if the vehicle and trailer then tried to negotiate a hump or ditch that forced the sleeve to rotate beyond the point of already being fully done up against the inside of the yoke.

Alternatively, if the pivots providing the second axis of rotation are not threaded, then a washer, such as a wave washer, that is compressed between the sleeve and the arm of the yoke is an alternative means for stopping unwanted tilting of the sleeve while retaining a full range of rotation of the yoke about the sleeve while towing.

Referring now to the specific embodiment depicted in the Figures, and more particularly to FIG. 1, the line A-B runs vertically from A above to B below, lines C-D and E-F pass through the line A-B at a right angle.

The tow-bar 1 has a pillar-hole 2. The part of the tow-bar 1 that is rigidly linked to the rear of a first towing vehicle (not depicted) is drawn of indefinite length to distinguish it from the free end which is furthest from the rear of the vehicle and has a rounded outline.

In the following description the term 'front' applies to being nearer to the towing vehicle and the term 'rear' applies to being further away from the vehicle to which the tow-bar 1 is attached.

The first vehicle component of the coupling device is a pillar 3. The pillar 3 is securely linked to the tow-bar 1 by passing the threaded stem 4 down through the pillar-hole 2 then locating the spring-washer 5 on the stem 4 and locating and tightening the securing-nut 6 on the stem 4. The pillar 3, as further described hereunder, can be manufactured as an integral part of the tow-bar 1 in which case the stem 4, spring-washer 5 and securing-nut 6 are redundant.

The pillar 3 has a cylindrical body 7 that is surmounted by a part-hemispherical-section 8 having a domed top is joined by a neck 9 to the bottom of a truncated semi-spherical head 10. A circumferential groove 11 is set into the head 10 below the level of the equator 12. Further details of the profile of the pillar 3 are outlined in the description of FIG. 7.

The body 7, the part-hemispherical-section 8, the neck 9, the head 10 and the groove 11 are symmetric about a first axis along line A-B.

The same radius length defines the curvature of the body 7, the part-hemispherical-section 8 and the head 10.

The trailer component of the coupling that links to the pillar 3 is a cylindrical sleeve 13 adapted to matably receive and rotate around the pillar 3. The relationship between the head 10, the part-hemispherical-section 8 and the body 7 ensures that, once the bottom of the sleeve 13 has reached the level of the top of the body 7, the axis of the sleeve 13 is fully aligned with the axis of the body 7 to form a first axis and continued engagement of the sleeve 13 over the pillar 3 is not impeded. The relationship between the part-hemispherical-section 8, the head 10 and the body 7 also ensures that the sleeve 13 does not hold up on the neck 9 if the axis of the sleeve 13 is not fully aligned with the axis of the pillar 3 at the initiation of their engagement.

There are two stepwise reductions in the outside diameter of the upper part of the sleeve 13. The lower reduction in outside diameter of the sleeve 13 creates a shelf 14 that supports a collar 15 which is free to move with respect to the sleeve 13, such as rotating around the sleeve 13 or moving along the sleeve 13 substantially in a vertical direction. The second more pronounced and higher up reduction in outside diameter of the sleeve 13 generates a space for a biasing means, in the form of a spring 16, to be located between the sleeve 13 and the collar 15.

The pillar 3 and the collar 15 retain an axial symmetry about a common axis regardless of the position of the sleeve 13 located between the pillar 3 and the collar 15.

The top of the collar 15 is closed over with an integral raised lid 17 that has dimensions and an external texture that make it easy to manually grasp and rotate.

The inner aspect of the collar 15 has a recess 18 and part of the wall of the recess 18 presents a cam surface 19.

The spring 16 has an upper projection 20 and a lower projection 21 that engage respectively in a lid-spring-hole 22 and a sleeve-spring-hole 23, located in an upper shelf or sleeve 13.

A bore 24, which is preferably threaded in the side wall of the collar 15 accepts a projection, in the form of a dog-pointed set-screw 25, which is long enough to protrude into a substantially horizontal slot 26 in the sleeve 13. The inwardly protruding end of the dog-pointed set-screw 25 is free to move within the confines of the slot 26. The length of the slot 26 controls how far the collar 15 can rotate around the sleeve 13 (See FIGS. 3 and 5). The collar 15 is unable to separate from the sleeve 13 while the dog-pointed set-screw 25 is engaged in the slot 26.

Bevels 53 on the collar 15 and the shelf 14 (see FIGS. 2 and 4) produce an area between the bottom of the collar 15 and the shelf 14 that can retain an elastic sealing ring 52 which seals against ingress of unwanted contaminants between the collar 15 and sleeve 13.

A further sealing ring, in the form of an O-ring 54 is located in an O-ring-groove 55 near the base of the pillar 3 seals against the inner aspect of a fully engaged sleeve 13.

An aperture 27 is formed through a side wall of the sleeve 13. The aperture 27 has a uniform diameter except at its inner end where there is a localised narrowing 28 (see FIGS. 2, 3, 4 and 5 for magnified views of aperture 27). A locking element, such as ball-bearing 29 is free to move back and forth along the aperture 27 between limits imposed by the narrowing 28 at the inner end and at the outer end by what part of the inner face of the collar 15 lies opposite the aperture 27.

Rotating the collar 15, to the position where the recess 18 lies opposite the aperture 27, allows part of the ball-bearing 29 to prolapse into the recess 18 to an extent which ensures that no part of the ball-bearing 29 protrudes inside the line of the internal face of the wall of sleeve 13. This allows the sleeve 13 to slide freely over the pillar 3.

Rotating the collar 15 back, from the position where the recess 18 lies opposite the aperture 27, causes the cam surface 19 to push the ball-bearing 29 along the aperture 27. Continued rotation of the collar 15, until no part of the recess 18 is overlying the aperture 27, ensures that part of the ball-bearing 29 protrudes inside the line of the internal face of the wall of sleeve 13.

The groove 11 lies opposite the aperture 27 when the sleeve 13 is engaged with the pillar 3 to the point of resting on the tow-bar 1. When so engaged, the position of the collar 15 determines whether part of the ball-bearing 29 protrudes from the inner end of the aperture 27 into the groove 11 thereby locking the sleeve 13 to the pillar 3 while remaining free to track around the groove 11 in accordance with any rotation of the sleeve 13 around the pillar 3. The profile of the groove 11, as viewed in a vertical section taken along a radius to the pillar 3, is matched to receive that part of the ball-bearing 29 which protrudes from the inner end of the aperture 27 when the recess 18 is not over any part of the aperture 27 and the sleeve 13 is forcibly raised on the pillar 3 such that the engagement of the ball-bearings 29 with groove 11 prevents any further disengagement of the sleeve 13 from pillar 3. However, the sleeve 13 firstly separates from the upper face of the towbar 1 before the ball-bearings 29 restrain further diseneagement of the sleeve 13 from the pillar 3 so that collar 15 can readily be returned to the locked position even if a small amount of debris is stopping the sleeve 13 from fully seating on the towbar 1.

In the process of fully engaging the sleeve 13 with the pillar 3, the collar 15 is rotated to the first unlocked position such that a respective recess 18 is aligned with the aperture 27, thereafter the sleeve 13 is moved with respect to the pillar 3 such that the head 10 displaces each locking element 29 to a position in a respective aperture 27 and partially into the aligned recess 18 so that no portion of each locking element 29 protrudes inwardly beyond the internal face of the wall of the sleeve 13.

The spring 16 is pre-tensioned so that it acts to maintain the collar 15 in the position where no part of the recess 18 aligns with the aperture 27. Rotating the collar 15 to the position where the recess 18 aligns with the aperture 27 increases the tension in the spring 16, to allow each locking element 29 to be moved to the first unlocked position.

A connector which is connected to the second towed vehicle includes a yoke 30 having two arms 31 joined by a web in a substantially U-shaped configuration. Each arm 31 has a notch 32 and hole 33 for receiving securing means, in the form of a bolt 34. The shank 35 of the bolt 34 is a precise fit in the hole 33.

The bolts 34 pass through the holes 33 and screw into bores, in the form of threaded-holes 36, in the sides of the sleeve 13. The threaded-holes 36 share a common second axis.

The bolts 34 are tightened so as to compress the arms 31 toward each other. A bolt-head 37 is then welded to the outer surface of the arm 31. The arms 31 are not bought into contact with the sides of the sleeve 13. The yoke 30 thereby remains free to angle up or down on the sleeve 13 by the bolts 34 rotating in the threaded-holes 36.

An alternative securing means may be in the form of a projection (not shown) oppositely located on each side of the sleeve 13 onto which a respective arm 31 engages. This alternative is particularly useful where the arms 31 are provided in two halves. Friction (for the same reason given below) may be provided through an adjusting screw pressing into the projection.

A stopper 38 on the inside of the web portion of yoke 30 obstructs the sleeve 13 from turning over and over on the bolts 34 and thereby avoids the sleeve 13 locking-out on the inside of the arms 31.

The compression of the arms 31 toward each other places tension on the bolts 34 which induces friction at the pivoting of the bolts 34 within the threaded-holes 36. This friction is necessary to avoid a top heavy, sleeve 13, attached collar 15 and attached lid 17, combination from adopting, by the influence of gravity, an undesired orientation when the sleeve 13 is not coupled to the pillar 3.

Marked rotation (trailer nearing a jackknife position) of the sleeve 13 on the pillar 3 brings one or other of the bolts 34 to a location above the tow-bar 1. In these circumstances downward hinging of the yoke 30 is limited by an arm 31 impinging on the tow-bar 1. The notches 32 increase the available range of downward hinging of the yoke 30 whenever the sleeve 13 is markedly rotated to either side.

"Trailer ball weight" is defined as the downward thrust present at a trailer coupling due to a greater part of a trailer's mass being forward of the trailer's wheels. The location of the bolts 34 on the sleeve 13 ensures that the tow-bar 1 directly supports the trailer ball weight without generating a force with a moment that would act to tilt the sleeve 13 on the pillar 3 and in turn to tilt the pillar 3 on the tow-bar 1.

Extending out from the back of the yoke 30 is a rigidly attached cylindrical shaft 39 that is free to rotate inside a tube 40 that in turn is rigidly attached to a base-plate 41. The base-plate 41 is attached to the trailer's draw-bar by any means obvious to those skilled in the art. The shaft 39 is restrained from pulling out of the tube 40 by a nut 42 screwed onto a rear end of the shaft 39.

Grease nipples 43 are located in the sleeve 13, the lid 17 and the tube 40 to supply lubricant to underling bearing surfaces.

A lock-pivot 44 attaches to the sleeve 13. A trigger 45 is free to rotate around a stub-axle 46 that permanently locates the trigger 45 on the lock-pivot 44. The shape of the trigger 45 and the positioning of a padlock-hole 47, in the lock-pivot 44, are such that the locking-protrusion 48, of the trigger 45, is unable to disengage the collar-locking-hole 49 whenever a padlock is located in the padlock-hole 47.

A further biasing means in the form of a secondary-lock-spring 50 extends between anchoring rivets 51 that are respectively located in the trigger 45 and lock-pivot 44 such that the spring 50 is under tension and acting to maintain the locking-protrusion 48 within the collar-locking-hole 49.

The collar 15 is only free to rotate on the sleeve 13 when the trigger 45 is pulled back, against the resistance of the secondary-lock-spring 50, to the point where the locking-protrusion 48 disengages the collar-locking-hole 49.

Figure 2:
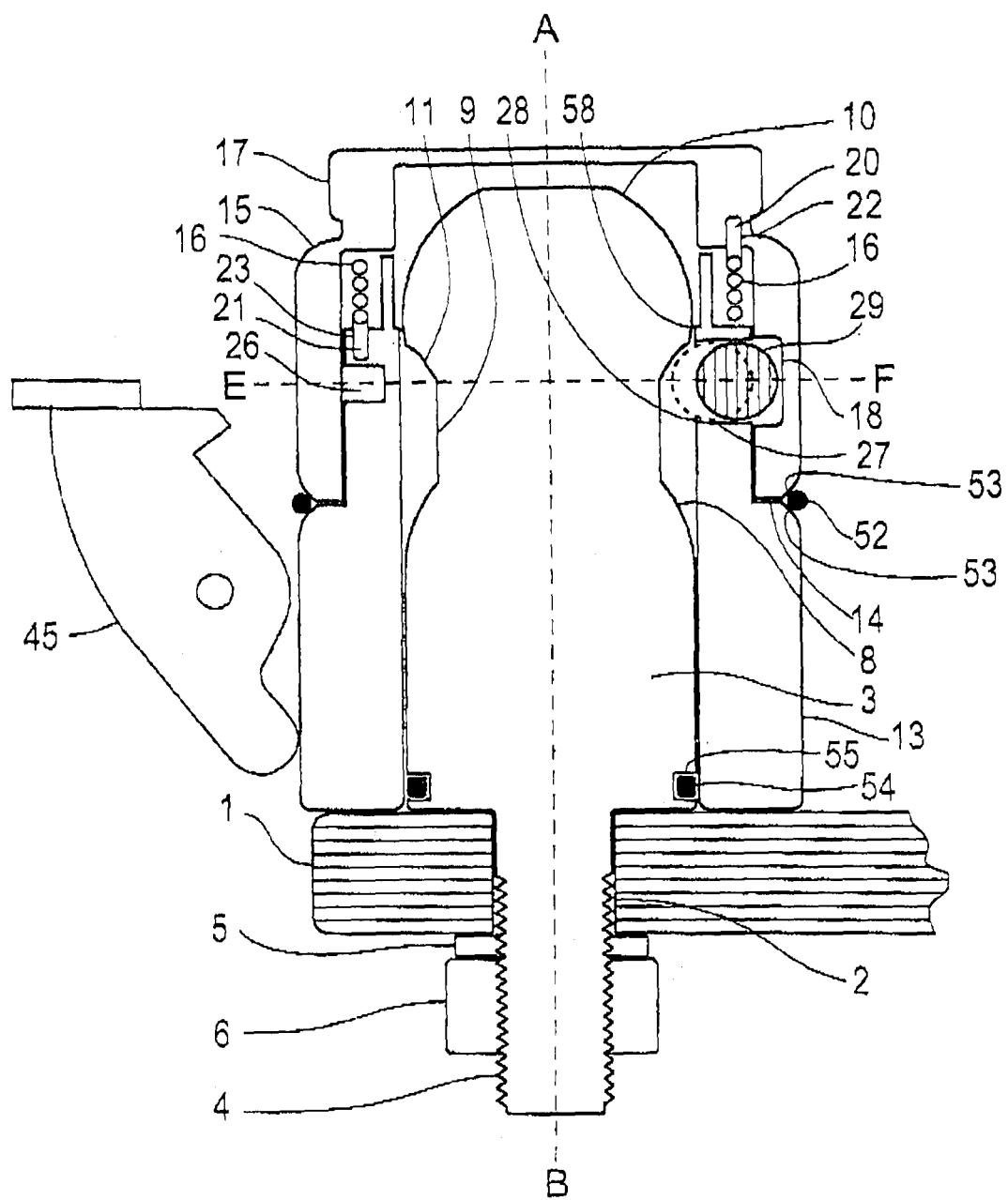
FIG. 2 is a vertical sectional view, through the lines A-B and E-F in FIG. 1, when a sleeve and pillar of the coupling device are engaged and free to separate.

Referring to FIG. 2, the slot 26 is visible but the dog-pointed set-screw 25, which denies separation of the collar 15 from the sleeve 13, is out of this plane of the view.

For simplicity of illustration a single aperture 27 and ball-bearing 29 are illustrated. Alternative embodiments involve a plurality of apertures 27 containing respective ball-bearings 29 that engage a groove 11 or a plurality of grooves 11. Multiple apertures 27 are preferably distributed uniformly around the circumference of the sleeve 13 through the wall of sleeve 13. A plurality of apertures 27 requires a respective plurality of recesses 18 and cam surfaces 19 in the collar 15.

The diameter of the ball-bearing 29 has a working tolerance to the diameter of the aperture 27. The aperture 27 passes through the full thickness of the wall of the sleeve 13. The wall thickness of the sleeve 13 is less than the diameter of the ball-bearing 29 and consequently the ball-bearing 29 is obliged to always protrude from at least one end of the aperture 27.

The inner end of the aperture 27 has a localised-narrowing 28 that stops the ball-bearing 29 escaping to the interior of the sleeve 13 when the tow-pillar 3 is not located in the interior of sleeve 13.

The depth of the recess 18 is less than half the diameter of the ball-bearing 29 so the equator of the ball-bearing 29 does not escape beyond the outer end of the aperture 27.

The depth of the pocket 18 and the length of the aperture 27 are dimensioned to ensure that the ball-bearing 29 can prolapse into the recess 18 to an extent whereby the ball-bearing 29 does not protrude beyond the internal face of the sleeve 13 when the recess 18 is aligned over the aperture 27 as depicted. The sleeve 13 can engage or disengage the pillar 3 whenever the collar 15 is rotated to the position where the recess 18 fully aligns with the aperture 27.

The upper projection 20 of the spring 16 is engaged with a lid-spring-hole 22 and the lower projection 21 is engaged with a sleeve-spring-hole 23. The tensioned (wound up) spring 16 acts to rotate the collar 15 from the illustrated position in FIG. 2, of the recess 18 aligning with the hole 27, to the position where the recess 18 does not align with the aperture 27.

Figure 4:
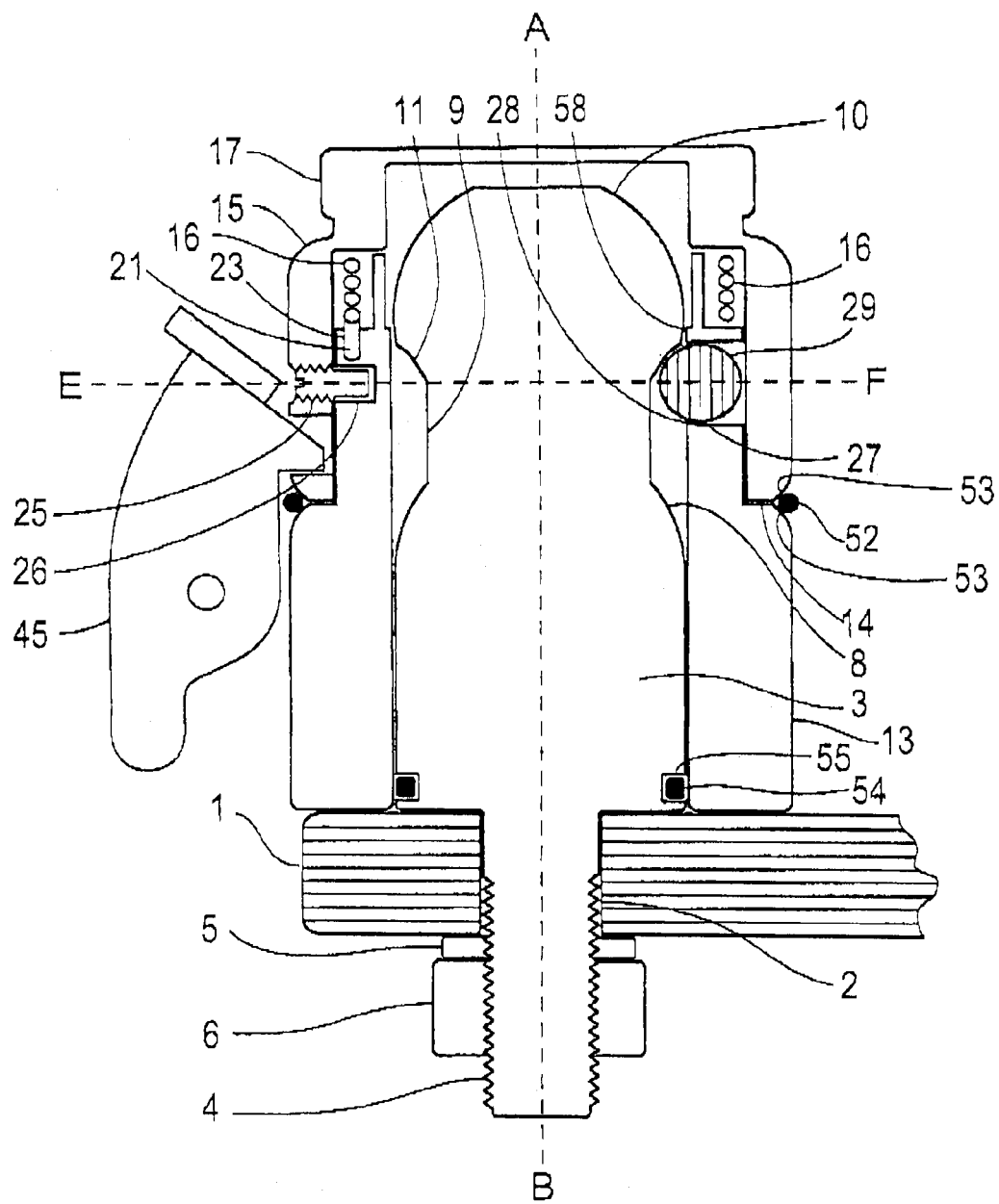
FIG. 4 is a vertical-sectional view, through lines A-B and E-F in FIG. 1, when the sleeve and pillar of the coupling device are fully engaged and locked together.
Figure 5:
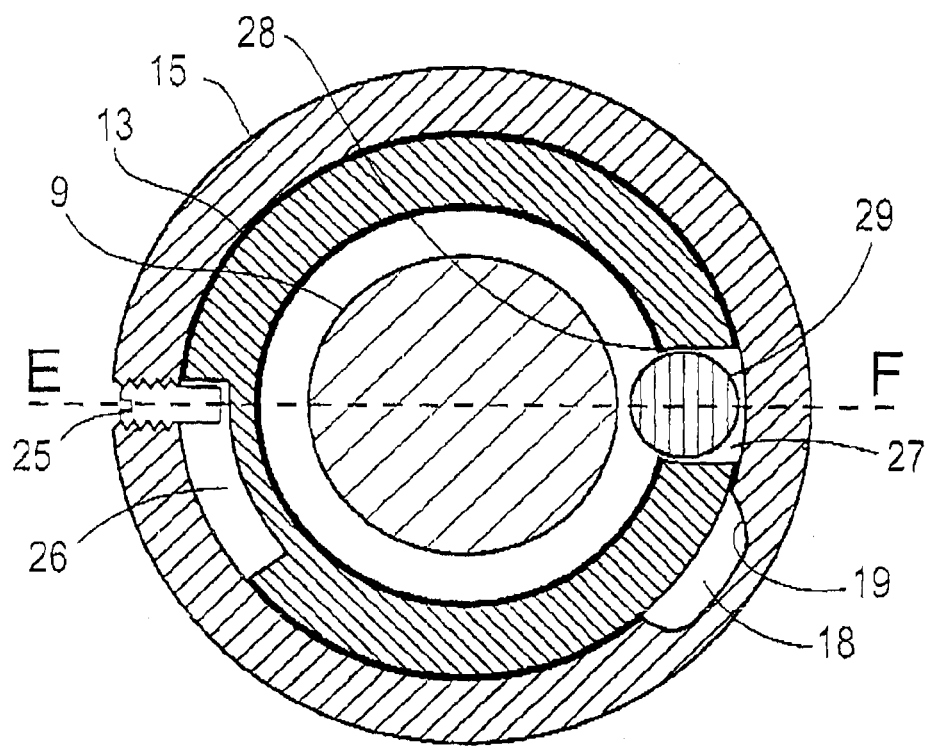
FIG. 5 is a cross-sectional view through, the line E-F in FIG. 1, when the sleeve and pillar of the coupling device are fully engaged and locked together.

Automatic primary locking, of the sleeve 13 to the tow-pillar 3, occurs whenever the spring 16 rotates the collar 15 from the position depicted, where the recess 18 aligns with the aperture 27, to the position depicted in FIGS. 4 and 5 where the recess 18 does not align with the aperture 27.

Manually applied rotational force to the lid 17 positions the collar 15, against the resistance of the pre-tensioned spring 16, so that the recess 18 aligns with the aperture 27. Alternative embodiments could employ electric motors or electromagnets to rotate the collar 15 to the position where the recess 18 aligns with the aperture 27.

The obligation for a ball-bearing 29 to always protrude, from one or other end of an aperture 27, can also be satisfied by embodiments having a series of two or more matching ball-bearings aligned adjacent each other within aperture 27 of appropriate length and diameter.

A further embodiment employing a rod with hemispherical ends fulfills the function of one or more ball-bearings 29 provided the diameter and length of the rod is appropriately matched, according to criteria explained above, to the diameter and length of the aperture 27.

A number of mechanisms, that would be obvious to those skilled in the art, can produce a latch that ensures the sleeve 13 is locked to the pillar 3 by blocking the collar 15 rotating to a position where any part of the recess 18 aligns with the aperture 27. The latch can be activated automatically by incorporating a spring (independent of spring 16) that moves the latch's locking element into the position which blocks rotation of the collar 15 to the position where any part of the recess 18 aligns with the aperture 27.

A preferred embodiment for a latch that involves a trigger 45 is described with respect to FIG. 1 and is seen in the disengaged position in the cross-section of FIG. 2.

An anti-theft feature, such as a padlock, can be employed to stop rotation of the collar 15 around the sleeve 13 either directly or by keeping a latch's locking element in the position that stops rotation of the collar 15 to the position where the recess 18 aligns with the aperture 27.

FIGS. 2, 3, 4 and 5 depict a process whereby the alignment or lack of alignment of the recess 18 with the aperture 27 is determined by rotating the collar 15 around the sleeve 13. Alternative embodiments include mechanisms that determine this alignment, or lack of alignment, by vertical displacement of the collar 15 on the sleeve 13 or by a mixture of vertical and rotary displacement of the collar 15 relative to the sleeve 13.

The engagement or lack of engagement of the ball-bearing 29 with the groove 11 cannot be directly observed by the user of the coupling device. It is therefore desirable to incorporate indicia means or an external marker to indicate when no part of the recess 18 is aligned with the aperture 27 and that the sleeve 13, when resting on the towbar 1, is thus securely locked to the pillar 3. The external marker can take any form that would be obvious to those skilled in the art. Engagement of the locking protrusion 48 in the collar-locking hole 49 is one such index.

The clearance between the body 7 and the sleeve 13 is less than the clearance between the sleeve 13 and the collar 15. This difference in clearances ensures that if more than one aperture 27 is used the compression forces on the ball-bearings 29, whenever the sleeve 13 tries to displace upwards on the pillar 3, are shared equally on each ball-bearing 29 regardless of the pillar 3 being pushed, by the forces involved with towing, to one side of the sleeve 13.

The internal diameter of the sleeve 13 is uniform up to the indicated level 58. Level 58 lies above the aperture 27 and when the sleeve 13 is resting on the tow-bar 1 the level 58 is located below the equator 12. Above the level 58 the internal diameter of the sleeve 13 is increased sufficiently to ensure that the sleeve 13 never contacts the head 10 during towing with the sleeve 13 securely locked onto the pillar 3.

The dust and water sealing elastic-ring 52 rests in the groove formed by the bevels 53 on the edges of the collar 15 and the shelf 14.

The O-ring 54 lies in an O-ring-groove 55 and provides a seal between the sleeve 13 and the pillar 3 to limit dust or water entering from below.

Figure 3:
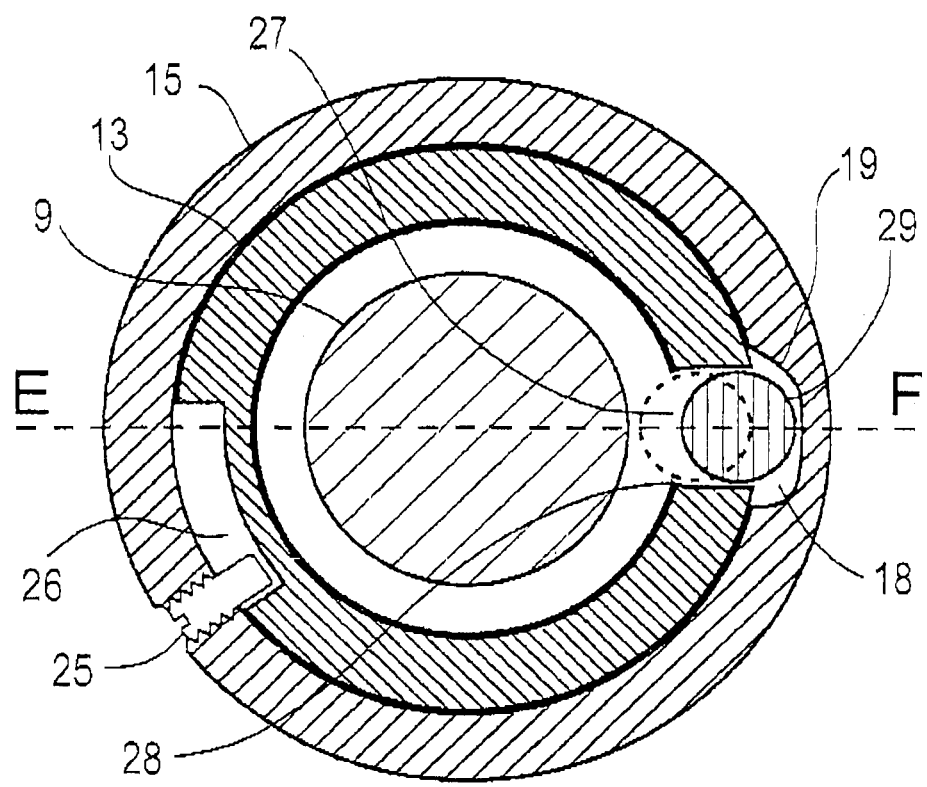
FIG. 3 is a cross-sectional view through line E-F in FIG. 1, when the sleeve and pillar of the coupling device are engaged and free to separate.

Referring to FIG. 3, the neck 9 is at the level of the middle of the ball bearing 29 which is located in the aperture 27. In other words, the line E-F corresponds with the centre line or axis of aperture 27. This, in turn, corresponds with the centre of ball-bearing 29 and at this level the neck 9, not the groove 11, lies opposite the middle of the ball-bearing 29 (see FIG. 2).

The collar 15 is in the same position as depicted in FIG. 2 where the aperture 27 is aligned with the recess 18 and there is no impediment to the ball-bearing 29 being pushed into the recess 18 so that the sleeve 13 can slide on or off the pillar 3.

In practice the ball-bearing 29 only moves progressively to the location depicted in FIGS. 2 and 3, when the sleeve 13 is raised or lowered on the pillar 3 while the recess 18 is aligned with the aperture 27.

The dog-pointed set-screw 25 is at one end of the slot 26 and will return to the opposite end of the slot 26 whenever the influence of the pre-tensioned spring 16 is not being restrained either manually or by other means.

Referring to FIG. 4, the dog-pointed set-screw 25 is located in the slot 26 and thereby denies separation of the collar 15 from the sleeve 13.

The collar 15 is depicted in the position that the pre-tensioned spring 16 mandates in the absence of opposing forces or obstructions. When the collar 15 is in this position the ball-bearing 29 is obliged to prolapse into the groove 11 because the recess 18 (out of the plane of view) has no overlap with the aperture 27. It is not possible to slide the sleeve 13 upwards on the pillar 3 when the ball-bearing 29 is engaged simultaneously with the aperture 27 and the groove 11.

A disengaged sleeve 13 is unable to slide all the way down over the pillar 3 if the collar 15 is positioned as illustrated in FIGS. 4 and 5. The complete engagement, of the sleeve 13 with the pillar 3, is blocked by the obstructed ball-bearing 29 coming into contact with the head 10. Successful complete engagement, of the sleeve 13 with the pillar 3, is manifestly absent even though the collar 15 is located in the position that signifies successfully locking of the sleeve 13 to the pillar 3.

Successful complete engagement and locking of a disengaged sleeve 13 to the pillar 3 requires rotation of the collar 15, against the opposition of the pre-tensioned spring 16, from the position depicted in FIG. 4 and in FIG. 5 to the position depicted in FIGS. 2 and 3.

Presenting a disengaged sleeve 13 to the pillar 3, when the lid 17 is held in the position where the recess 18 is fully aligned with the aperture 27, causes the ball-bearing 29 to contact the head 10 and the ball-bearing 29 is free to move progressively into the recess 18 thereby allowing further engagement to proceed. Complete engagement of the sleeve 13 with the pillar 3 culminates in the sleeve 13 resting upon the tow-bar 1 and at that stage the aperture 27 lies at a level where an inwardly prolapsing ball-bearing 29 can be accommodated within the space created by the groove 11 and the void around the neck 9.

Releasing the hold on the lid 17, after the sleeve 13 has come to rest on the tow-bar 1, allows the tensioned spring 16 to rotate the collar 15 to the position depicted in FIG. 4 and in FIG. 5. This rotation of the collar 15 causes the cam surface 19 to drive the ball-bearing 29 inwards along the aperture 27 to the final locked position illustrated in FIG. 4 and in FIG. 5.

When the sleeve 13 is in contact with the tow-bar 1 the aperture 27 lies at a level where the inwardly displaced ball-bearing 29 is slightly below the level where it would make full contact with the groove 11. The clearance between the ball-bearing 29 and the groove 11, when the sleeve 13 rests on the tow-bar 1, ensures that the ball-bearing 29 is not under load while the trailer ball weight keeps the sleeve 13 in contact with the tow-bar 1. This clearance also ensures that there is no obstruction to the tensioned spring 16 fully rotating the collar 15 to the locked position where there is no overlap of the aperture 27 by the recess 18.

If rotation of the collar 15 is incomplete and the recess 18 is partially aligned with the aperture 27 outward pressure on the ball-bearing 29 can induce, by pressing on the cam surface 19, rotation of the collar 15 to the unlocked position.

Releasing the sleeve 13 from the pillar 3 requires manual rotation of the collar 15, against the opposition of the pre-tensioned spring 16, to the position depicted in FIGS. 2 and 3 where the recess 18 lies opposite the aperture 27. Upward displacement of the sleeve 13 on the pillar 3 causes the ball-bearing 29 to contact the contour of the groove 11 and the underside of the head 10. This contact pushes the ball-bearing 29 along the aperture 27 and into the recess 18 so that the sleeve 13 is free to fully disengage the pillar 3.

A grease nipple 43, out of the plane of view, supplies grease to the space surrounding the spring 16 and also to the bearing surfaces on the inner aspect of collar 15, the aperture 27, the ball-bearing 29, the slot 26, the end of the dog-pointed set-screw 25, the outside of the sleeve 13 (above the level of the shelf 14) and the inner surface of the sleeve 13.

Referring to FIG. 5, the collar 15 is held in the position illustrated in FIG. 4 by the pre-tensioned return-spring 16 (above plane of view). The dog-pointed set-screw 25 is located at the opposite end of the slot 26 to that depicted in FIG. 3. The degree of rotation of the collar 15, between that depicted in FIG. 3 to that depicted in FIG. 5 has brought the recess 18 to a point where it has no overlap with the aperture 27. The ball-bearing 29 is trapped in a position that precludes the sleeve 13 disengaging from the pillar 3.

Figure 6:
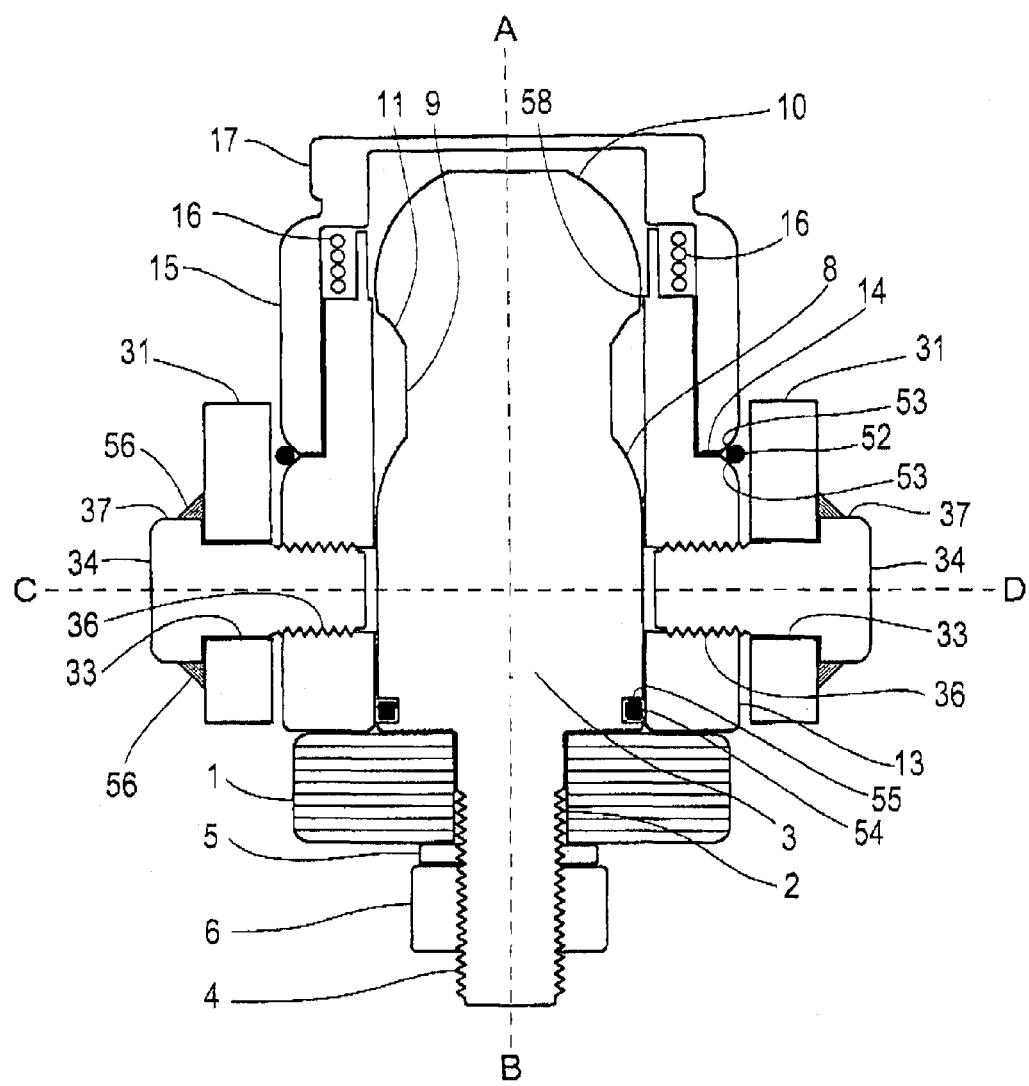
FIG. 6 is a vertical-sectional view through the lines A-B and C-D in FIG. 1.

Referring to FIG. 6, the bolts 34 pass through the bolt-holes 33 and screw into threaded-holes 36 in the sides of the sleeve 13. The threaded-holes 36 share a common second axis.

The bolts 34 are tightened so as to compress the arms 31 toward each other. Welds 56 anchor the bolt-heads 37 to the outer aspect of the arms 31. The arms 31 are not bought into contact with the sides of the sleeve 13. The yoke 30 thereby remains free to angle up or down on the sleeve 13 by the bolts 34 rotating in the threaded-holes 36.

Grease nipples 43 (out of the plane of view) in the sleeve 13 provide lubrication to the threaded holes 36.

Figure 7:
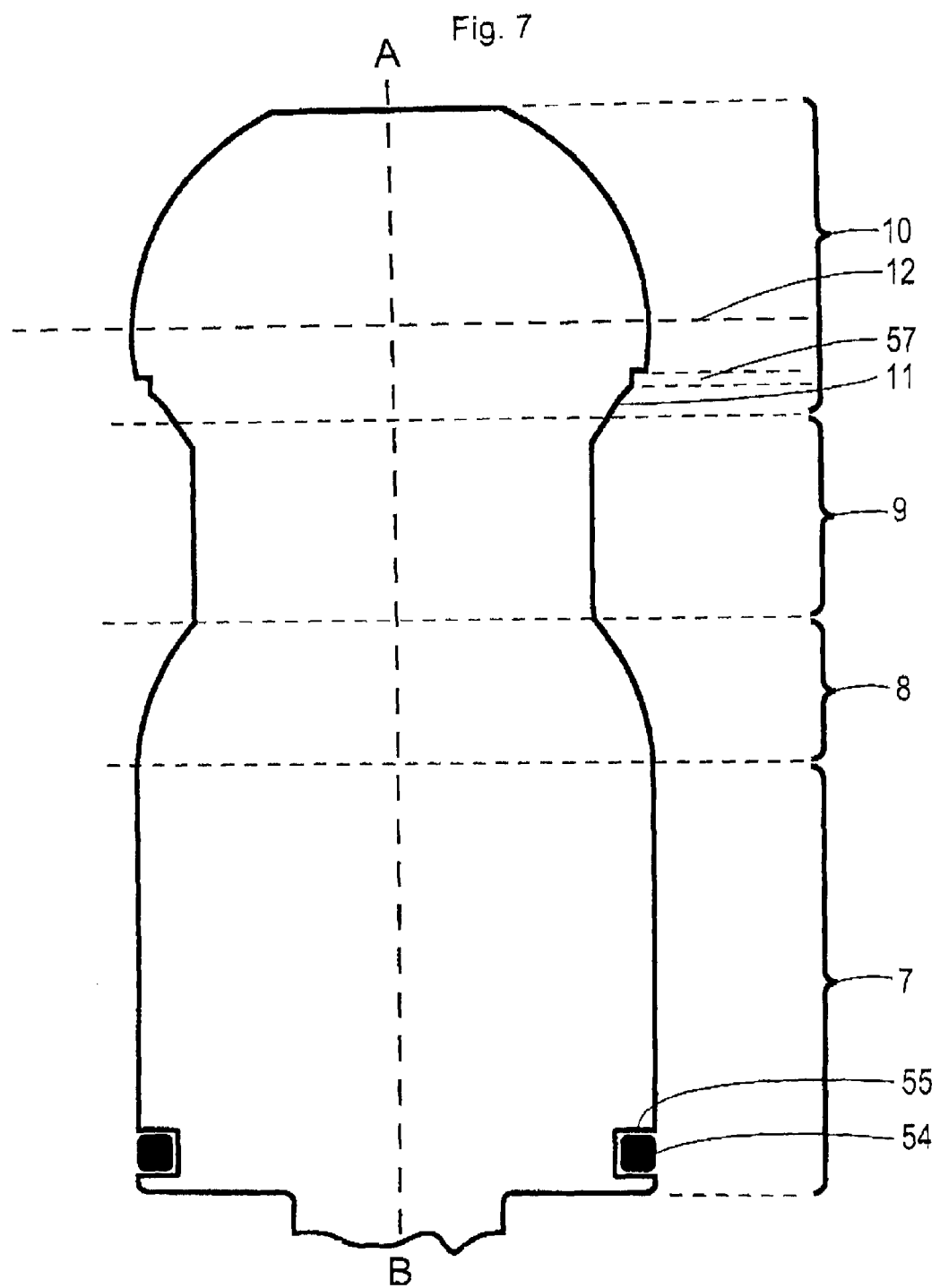
FIG. 7 is an enlarged vertical sectional view of the pillar in FIG. 1 passing through the line A-B.

Referring to FIG. 7, the neck 9 extends from the head 10 down to the part-hemispherical-section 8. The groove 11 is set into the head 10 below the level of the equator 12. The profile of the groove 11 is matched to the profile of a segment of the upper and inner quadrant of the ball-bearing 29. The groove 11 is not designed to engage an entire quadrant of ball-bearing 29, but only a segment, approximately from about 285 degrees to 330 degrees (looking front-on into the plane of FIG. 4) engages the groove 11. The diameter of the pillar 3 at the projected junction between the head 10 and the groove 11 is reduced to create a buffer-zone 57 that does not engage with the ball-bearing 29 between approximately 330 and 360 degrees (looking front-on into the plane of FIG. 4).

Any distortion of the groove 11 where it meets the buffer-zone 57, as a consequence of pressure from the ball-bearing 29, therefore lies inside the projected continuation of the spherical profile of the head 10. A sleeve 13 passing over the head 10 will therefore not be impeded by encountering a dimension that exceeds the diameter of the head 10.

The neck 9 is confluent with the head 10 below the level of the groove 11. The section of the neck 9 that lies opposite the level of the aperture 27, when the sleeve 13 is resting on the tow-bar 1, has a diameter that ensures it cannot impede the ball-bearings 29 moving freely in response to the position of the collar 15.

The profile of the neck 9, below the level of the aperture 27, when the sleeve 13 is resting on the tow-bar 1, is configured to ensure that a sleeve 13 passing over the head 10 will not encounter a contour that would impede continued smooth descent of the sleeve 13 over the pillar 3. It is self evident that a variety of profiles can satisfy this requirement.

The profile of the neck 9 is also configured to ensure that a sleeve 13 passing over the head 10 cannot contact the part-hemispherical-section 8 at an angle that would impede continued smooth descent of the sleeve 13 over the part-hemispherical-section 8. It is self-evident that a variety of profiles can satisfy this requirement.

The coupling device of the present invention provides a range of articulation between a towing vehicle and a trailer that meets any conceivable requirement. The design provides for 360 degrees of rotation around the long axis of the vehicle so that trailer rollover does not inevitably result in vehicle rollover. Side to side movement, about the long axis of the pillar, is possible through to the full jack-knife position. Upward angulation to 90 degrees is possible with all degrees of side to side movement. Downward angulation to 90 degrees is possible when the trailer is directly behind the vehicle. There is some restriction of downward angulations when the trailer is off to the side and approaching a jackknife position. Even then downward angulation to 70 degrees is possible.

The coupling device disclosed herein provides automatic primary and automatic secondary locking of the trailer to the vehicle.

Locking the engaged coupling device, against trailer theft, with a padlock or similar device is easy with the coupling device disclosed herein. The padlock can also remain in place while the vehicle and trailer are in motion over any terrain.

The pillar mechanism as disclosed provides a much greater range of articulation than that provided by a conventional tow-ball based coupling device.

The sleeve disclosed in this coupling device will not bind onto the pillar whereas mechanisms that have relied upon adding additional points of articulation to a modified cup, which couples with a conventional tow-ball, are prone to this undesirable event that can culminate in undoing the tow-ball from the tow-bar or snapping the tow-ball off the tow-bar.

During coupling the disclosed mechanism has self-centering properties that are not present in couplings which rely upon the insertion of a hitching pin to achieve linkage. This self-centering property makes coupling far easier especially when there is an impediment to manhandling the trailer to the precise location required to achieve linkage. The impediment may be either the weight of the trailer and/or the nature of the terrain over which the trailer's wheels have to move to achieve the desired alignment for coupling to proceed.

The presence of any load at right angles to the long axis of a hitching-pin will tend to lock the hitching-pin in its engaged position. Removing a hitching-pin in these circumstances can be exceedingly difficult and may require hammering it out which may in turn cause damage. By comparison, with the disclosed pillar mechanism any impediment to disengagement, caused by loading lending to lock the sleeve onto the pillar, can be overcome by using the progressive lifting power of the trailer's jockey wheel or the lifting power of a draw bar stand.

The maximum height of an engaged coupling, above a tow-bar, influences the ability to open a door on the rear of the towing vehicle. Four-wheel-drives frequently have such doors. The overall height of the coupling disclosed in this embodiment can be kept well below the height of the handle that controls the release of the tongue which secures a conventional ball-coupling to a conventional tow-ball.

Traction or compression forces, in the line of the long axis of the trailer, cause the cup of a ball-coupling to ride-up on the tow-ball. The tongue of the ball-coupling stops disengagement but in so doing the tongue may become wedged under the head of the tow-ball to an extent that makes its withdrawal, to the released position, difficult or impossible until the traction or compression forces are relieved. By comparison, with the coupling device disclosed in this embodiment such traction or compression forces are transmitted to a pillar which does not deflect the force in an upward direction. Consequently there is no tendency for the sleeve to ride-up on the pillar and thereby wedge the ball-bearing against the contact zone in a manner that would make it difficult to move the recess to the position that allows separation of the sleeve from the pillar.

With the pillar mechanism as disclosed the manual force required to overcome the spring operating the rotating collar automatic primary locking mechanism is less that that required to pull back the locking tongue on a typical ball-coupling. Physically weaker individuals are thus able to operate the ball-bearing based locking mechanism.

The disengaging of the locking tongue on a Hyland Hitch is even more difficult than a conventional ball coupling because the handle for the tongue does not lie along the line of withdrawal. This unsatisfactory arrangement is mandated by other aspects of the Hyland's overall design.

The collar of the disclosed coupling device can be grasped equally easily from any position and this makes it easier to position oneself to use the other hand to wind a jockey wheel up or down while holding the collar in the unlocked position.

The height above the tow-bar at which traction forces are transmitted, between the vehicle and the trailer, is lower with this pillar coupling than with a tow-ball coupling. As a consequence the stem anchoring the pillar to the tow-bar is subject to less stress than is the stem anchoring a conventional tow-ball that is subjected to the same traction load and where the pillar and seating-flange of the tow-ball have the same diameter.

The pillar of the disclosed coupling device has a diameter greater than the diameter of a conventional tow-ball and it is therefore impossible to inappropriately connect a conventional ball coupling to the pillar's head.

The greater diameter of the pillar in the disclosed coupling device in comparison with the flange on a conventional tow-ball means that there is less stress on the stem of the pillar as compared with the stress on the stem of a conventional tow-ball.

The broad area of contact and fine working tolerance between the sleeve and the pillar avoids noise emanating from the sleeve slogging on the pillar at the commencement of acceleration or breaking. Some conventional ball-couplings have an adjustment screw to remove the slack, between the tow-ball, the cup and the locking tongue, which generates such undesirable slogging and noise. The pillar mechanism as disclosed does not need such an adjustment screw or the inconvenience of trying to set it correctly.

The broad area of contact between pillar and sleeve minimises wear between these lubricated articulating surfaces.

The incorrect setting of the adjustment screw on a conventional ball-coupling can also impede the locking tongue properly engaging under the head of the tow-ball and/or generate difficulty in disengaging the locking tongue. No such dangers or difficulties can arise with the pillar based coupling as disclosed herein.

The primary locking mechanism and articular surfaces between pillar and sleeve are completely sealed against contamination with dust or water by strategically located O-ring seals.

The cleanliness of the pillar, when the sleeve is not attached, is provided by a dust cover that takes advantage of the O-ring seal on the bottom of the body of the pillar.

When the sleeve engages the pillar to the level of the hemispherical-section it is sufficiently advanced for it to be safe to place a hand on the top of the sleeve to activate the release of the automatic locking mechanism.

All articulations have readily accessible grease nipples that are placed to avoid grease on the user, damage to grease nipples or injury to user knocking against an exposed grease nipple. Currently available off-road couplings either have no grease nipples or have grease nipples that are located where they are subject to damage, to cause injury or to contaminate the user with grease if they brush against the coupling.

The shape of the disclosed coupling device is ideally suited to work well with the "Couple Mate" device (manufactured by Couplemate Pty Ltd in Australia) that is designed to assist with locating the trailer component immediately above the vehicle component while simultaneously protecting the rear of the towing vehicle.

The disclosed coupling device is not based on a tow-ball and therefore the draw-bar and coupling can be mounted higher than within the limited range stipulated in the Australian design Rules for 50 mm tow-balls.

The invention claimed is:

1. A coupling device for coupling a first vehicle to a second towed vehicle, the coupling device including:
    a pillar for mounting to a towbar attached to the first vehicle, said pillar having a semi-spherical head with an equator, a neck and a body with a part-hemispherical portion where the body meets the neck;
    a connector for connection to the second towed vehicle;
    a sleeve linked to the connector that engages with the pillar by fitting over the pillar; and
    a collar that fits over and engages with a portion of the sleeve for movement with respect to the sleeve;
    wherein the collar is movable with respect to the sleeve between a first unlocked position in which the sleeve is removable from the pillar and a second locked position in which the sleeve is not removable from the pillar;
    wherein further the relationship between the semi-spherical head, the body and the part-hemispherical portion is such that, under draw-bar weight, a substantially continuous smooth engagement of the sleeve over the body of the pillar is achieved;

wherein the sleeve has at least one aperture extending through the wall of the sleeve and a locking element positioned in each aperture of said at least one aperture;

wherein in the second locked position each locking element has a portion that protrudes inwardly beyond an internal face of the sleeve wall and in the first unlocked position each locking element resides at least partially within a respective aperture such that no portion of each locking element protrudes inwardly be and the internal face of the wall of the sleeve to enable the sleeve to slide freely over the pillar;

wherein the collar has at least one recess and the collar is movable to a position where a recess of said at least one recess is aligned with an aperture of said at least one aperture in the sleeve to enable movement of each respective locking element; and further including a biasing means connected to the collar and to the sleeve, the biasing means being biased at substantially all times to move the collar to a position where each recess is not aligned with a respective aperture in the sleeve.

2. A coupling device according to claim 1, wherein the collar has an integral lid and is rotatable with respect to the sleeve or the collar is movable along the sleeve.

3. A coupling device according to claim 1, wherein in the first unlocked position a portion of each locking element resides within a respective recess of the collar and to move each locking element from the first unlocked position to the second locked position the recess has a cam surface whereupon movement of the collar the cam surface contacts the locking element to push the locking element further into the aperture to assume the second locked position.

4. A coupling device according to claim 3, wherein the pillar has a circumferential groove set into an underside of the semi-spherical head, the circumferential groove having a profile matched to a profile of a portion of each locking element that engages in the groove when the collar is moved to assume the second locked position and a force is applied to lift the sleeve upwardly from a position of full engagement on the pillar.

5. A coupling device according to claim 4, wherein in order to move each locking element from the second locked position to the first unlocked position, the collar is moved such that a respective recess is aligned with the aperture, thereafter the sleeve is displaced with respect to the pillar so that each locking element bears against the groove and an underside of the head of the pillar and continued displacement of the sleeve forces each element to move in the aperture and partially into the aligned recess so that no portion of each locking element protrudes inwardly beyond the internal face of the wall of the sleeve.

6. A coupling device according to claim 4, wherein in the process of fully engaging the sleeve with the pillar, the collar is moved to the first unlocked position such that a respective recess is aligned with the aperture, thereafter the sleeve is moved with respect to the pillar such that the head displaces each locking element to a position in a respective aperture and partially into the aligned recess so that no portion of each locking element protrudes inwardly beyond the internal face of the wall of the sleeve.

7. A coupling device according to claim 4, wherein said pillar has a circumferential buffer zone between the circumferential groove and the semi-spherical head that precludes each locking element from interfering with a spherical contour of the semi-spherical head between the equator of the head and the circumferential groove.

8. A coupling device according to claim 1, in which a user moving the collar in order to align a recess with an aperture so as to allow each locking element to be moved to the first unlocked position increases the tension in the biasing means, thereafter the collar moving under the unrestrained action of increased tension in the biasing means to the position where each recess is not aligned with a respective aperture in the sleeve.

9. A coupling device according to claim 1, further including a trigger moveable between a collar-release position and a collar-hold position, such that in the hold position the trigger prevents movement of the collar on the sleeve from the second locked position and in the release position allows the collar to move on the sleeve to the first unlocked position.

10. A coupling device according to claim 9, wherein the trigger has a locking protrusion that engages in a locking hole in the collar when the collar is in the collar-hold position and is biased by a further biasing means to remain in the locking hole until manually moved to the collar-release position which increases the tension in the further biasing means.

11. A coupling device according to claim 9, wherein the trigger is restrained from moving to the collar-release position by a locking means.

12. A coupling device according to claim 1, wherein the sleeve has a slot for receiving a projection that resides in the wall of the collar to prevent separation of the collar from the sleeve, the projection moveable within the slot in accordance with the relative movement of the collar and sleeve between the first unlocked position and the second locked position.

13. A coupling device according to claim 1, further including one or more indicia means located on the collar or sleeve to indicate when no portion of the recess is aligned with a respective aperture.

14. A coupling device according to claim 1, wherein the sleeve forms lower and upper external shelves of different diameters with respect to the first axis, in which the lower external shelf supports the collar and the upper external shelf supports the biasing means.

15. A coupling device according to claim 14, further including a sealing ring located on the collar sealing against the ingress of foreign matter between the sleeve and the collar.

16. A coupling device according claim 1, further including an O-ring groove adjacent the bottom of the body of the pillar for locating a further sealing ring to seal against the ingress of foreign matter between the pillar and the sleeve when the sleeve is fully engaged with the pillar.

17. A coupling device according to claim 1, wherein each aperture has a narrowing section at the internal face of the sleeve to prevent substantially complete inward escape of a respective locking element from the aperture.

18. A coupling device for coupling a first vehicle to a second towed vehicle the coupling device including;
 a pillar for mounting to a towbar attached to the first vehicle, said pillar having a semi-spherical head with an equator, a neck and a body with a part-hemispherical portion where the body meets the neck;
 a connector for connection to the second towed vehicle;
 a sleeve linked to the connector that engages with the pillar by fitting over the pillar; and
 a collar that fits over and engages with a portion of the sleeve for movement with respect to the sleeve;
 wherein the collar is movable with respect to the sleeve between a first unlocked position in which the sleeve is removable from the pillar and a second locked position in which the sleeve is not removable from the pillar;

wherein further the relationship between the semi-spherical head, the body and the part-hemispherical portion is such that under draw-bar weight, a substantially continuous smooth engagement of the sleeve over the body of the pillar is achieved;

wherein the sleeve has at least one aperture extending through the wall of the sleeve and a locking element positioned in each aperture of said at least one aperture;

wherein the sleeve is rotatable with respect to the pillar about a first axis and the collar is displaceable with respect to the sleeve about the first axis; and wherein the clearance between the pillar and the sleeve is less than the clearance between the sleeve and the collar.

19. A coupling device according to claim 18, wherein the connector includes a yoke having a pair of arms and a shaft connected to the yoke, the shaft rotatable within a tube that is connected to the second towed vehicle through a plate.

20. A coupling device according to claim 19, wherein each arm of the yoke is connected to the sleeve by respective securing means.

21. A coupling device according to claim 20, wherein the securing means protrude into respective bores oppositely located in the wall of the sleeve, whereby the yoke is moveable about a second axis aligned with the centre of each bore.

22. A coupling device according to claim 21, wherein each bore is threaded and the arms are compressed toward one another by threading the respective securing means into a respective bore, such that increased friction is present between each securing means and respective bore.

23. A coupling device according to claim 21, wherein the shaft rotates about a third axis within the tube, so that movement between the first vehicle and the second towed vehicle through the coupling device is with respect to the first, second and third axes.

24. A coupling device according to claim 21, wherein the yoke has a protrusion extending therefrom which does not impede articulation about the second axis of the engaged coupling device in a range from about 90 degrees upward to about 90 degrees downward with respect to the second axis but does prevent continued rotation of the sleeve about the second axis beyond the range when the sleeve is disengaged from the pillar.

25. A coupling device according to claim 21, wherein each arm of the yoke has a notch at a lower portion thereof to enable an increased range of downward pivoting of the yoke about the second axis in circumstances where there is rotation of the sleeve about the pillar.

26. A coupling device according to claim 18, wherein the neck and part-hemispherical portion of the pillar do not impede movement of the locking elements and guide the sleeve into alignment with the pillar body with respect to the first axis, if given that the axis of the sleeve, after passing over the pillar head, is tilted with respect to the first axis.

27. A coupling device for coupling a first vehicle to a second towed vehicle the coupling device including:

a pillar for mounting to a towbar attached to the first vehicle, said pillar having a semi-spherical head with an equator, a neck and a body with a part-hemispherical portion where the body meets the neck;

a connector for connection to the second towed vehicle;

a sleeve linked to the connector that engages with the pillar by fitting over the pillar; and a collar that fits over and engages with a portion of the sleeve for movement with respect to the sleeve;

wherein the collar is movable with respect to the sleeve between a first unlocked position in which the sleeve is removable from the pillar and a second locked position in which the sleeve is not removable from the pillar; and wherein further the relationship between the semi-spherical head, the body and the part-hemispherical portion is such that under draw-bar weight, a substantially continuous smooth engagement of the sleeve over the body of the pillar is achieved;

wherein the sleeve has at least one aperture extending through the wall of the sleeve and a locking element positioned in each aperture of said at least one aperture;

wherein the sleeve is rotatable with respect to the pillar about a first axis and the collar is displaceable with respect to the sleeve about the first axis;

wherein the connector includes a yoke having a pair of arms and a shaft connected to the yoke, the shaft rotatable within a tube that is connected to the second towed vehicle through a plate;

wherein each arm of the yoke is connected to the sleeve by respective securing means;

wherein the securing means protrude into respective bores oppositely located in the wall of the sleeve, whereby the yoke is moveable about a second axis aligned with the centre of each bore; and wherein a vertical dimension from a bottom of the sleeve to the second axis is greater than a vertical dimension from a top of the pillar body to the equator of the pillar head.

* * * * *